(12) United States Patent
Shikii et al.

(10) Patent No.: US 11,298,739 B2
(45) Date of Patent: Apr. 12, 2022

(54) METHOD FOR MANUFACTURING IRON CORE

(71) Applicant: TOYOTA JIDOSHA KABUSHIKI KAISHA, Toyota (JP)

(72) Inventors: Kenta Shikii, Toyota (JP); Hiroshi Ishikura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 16/552,135

(22) Filed: Aug. 27, 2019

(65) Prior Publication Data

US 2020/0094305 A1  Mar. 26, 2020

(30) Foreign Application Priority Data

Sep. 20, 2018 (JP) .............................. JP2018-176065

(51) Int. Cl.
*B21D 28/22* (2006.01)
*B21D 24/02* (2006.01)
*H02K 15/02* (2006.01)

(52) U.S. Cl.
CPC ............. *B21D 28/22* (2013.01); *B21D 24/02* (2013.01); *H02K 15/02* (2013.01)

(58) Field of Classification Search
CPC ...... B21D 24/02; B21D 28/22; B21D 35/007; B21D 37/16; H02K 15/02
See application file for complete search history.

(56) References Cited

U.S. PATENT DOCUMENTS

| | | | | |
|---|---|---|---|---|
| 6,551,434 B1 * | 4/2003 | Yamada | ............... | B29C 48/9155 156/244.23 |
| 7,445,852 B2 * | 11/2008 | Maruko | ................. | C22C 45/02 336/233 |
| 2020/0094305 A1 * | 3/2020 | Shikii | .................... | B21D 28/22 |

FOREIGN PATENT DOCUMENTS

| | | |
|---|---|---|
| CN | 1943906 A | 4/2007 |
| CN | 102092059 A | 6/2011 |
| CN | 105244161 A | 1/2016 |
| JP | 2003153503 A | 5/2003 |
| JP | 2012166235 A | 9/2012 |
| JP | 2017225978 A | 12/2017 |

\* cited by examiner

*Primary Examiner* — Minh N Trinh
(74) *Attorney, Agent, or Firm* — Dickinson Wright, PLLC

(57) ABSTRACT

Provided is a method for manufacturing an iron core that enables reduction of variations in dimension of a plurality of metal plates that occur during pressing of the laminate of these metal plates. The method includes: a laminate preparation step of stacking a plurality of metal plates to prepare a laminate; a pressing step of giving a temperature gradient to the laminate and pressing the laminate with a pressing machine having a punch and a die; and a temperature-gradient removal step of removing the temperature gradient from the laminate. The pressing step gives the temperature gradient to the laminate so that the temperature rises from the punch-side to the die-side in the stacking direction of the laminate.

5 Claims, 7 Drawing Sheets

Thermal contraction

METHOD FOR MANUFACTURING IRON CORE

CROSS REFERENCE TO RELATED APPLICATIONS

The present application claims priority from Japanese patent application JP 2018-176065 filed on Sep. 20, 2018, the entire contents of which are hereby incorporated by reference into this application.

BACKGROUND

Technical Field

The present disclosure relates to a method for manufacturing an iron core.

Background Art

Iron cores are used for rotating electrical machines, such as an electric motor and a generator. The iron core in such use includes the laminate of thin-plate like iron-core pieces to reduce the iron loss. To produce such an iron core, a known technique stacks a plurality of metal plates for iron core and punches (i.e., presses) the laminate collectively into a predetermined shape for better productivity. JP 2003-153503, for example, discloses the manufacturing of an iron core using a device including a punch and a die. The device presses the laminate of a plurality of metal plates for iron core collectively to produce an iron core.

SUMMARY

Such collective pressing of the laminate of a plurality of metal plates for iron core causes variations in dimension of the processed metal plates between a plate close to the punch (punch-side) and a plate close to the die (die-side). This is because the metal plate the closest to the punch in the stacking direction is shear-deformed by punching, and the other metal plates receive the compressive deformation before a contact with the punch to extend and so generate deflections. The degree of extension of the metal plates for iron core due to compressive deformation increases with a distance of the metal plate from the punch, and so the variations in dimension after processing also increase accordingly.

To solve such a technical problem, the present disclosure provides a method for manufacturing an iron core that reduces variations in the dimension of a plurality of metal plates for iron core that occur during pressing of the laminate of the plurality of metal plates.

A method for manufacturing an iron core according to the present disclosure includes: a laminate preparation step of stacking a plurality of metal plates for iron core to prepare a laminate; a pressing step of giving a temperature gradient to the laminate and pressing the laminate with a device having a punch and a die; and a temperature-gradient removal step of removing the temperature gradient from the laminate. The pressing step gives a temperature gradient to the laminate so that the temperature rises from a part close to the punch to a part close to the die in the stacking direction of the laminate.

The pressing step of the method for manufacturing an iron core of the present disclosure gives a temperature gradient to the laminate so that the temperature rises from the punch-side to the die-side in the stacking direction. This expands the metal plates for iron core that are stacked from the punch-side to the die-side. The method presses such an expanded laminate, and then removes the temperature gradient from the laminate so as to contract the expanded metal plates for iron core. As a result, the method enables reduction of variations in dimension of a plurality of metal plates for iron core that occur during the pressing of the laminate of these metal plates.

In the method for manufacturing the iron core according to the present disclosure, the metal plates for iron core may include amorphous metal. This reduces the iron loss of the resultant iron core.

In the method for manufacturing the iron core of the present disclosure, the die may include a heater, and the pressing step may give a temperature gradient to the laminate with the heater. This gives a temperature gradient to the laminate quickly with a simple structure.

In the method for manufacturing the iron core of the present disclosure, the temperature gradient may be controlled based on a linear expansion coefficient of a material for the metal plates for iron core and a contact area between the metal plate for iron core and the upper face of the die. This shortens the time to give a temperature gradient to the laminate, and so reduces the influences from a temperature gradient given on the manufacturing time of an iron core.

In the method for manufacturing the iron core of the present disclosure, the temperature-gradient removal step may return the temperature of the laminate to room temperature. This does not require any device to remove the temperature gradient, and so saves the manufacturing cost.

The present disclosure enables reduction of variations in the dimension of a plurality of metal plates for iron core that occur during the pressing of the laminate of these metal plates.

DETAILED DESCRIPTION

Figure 1:
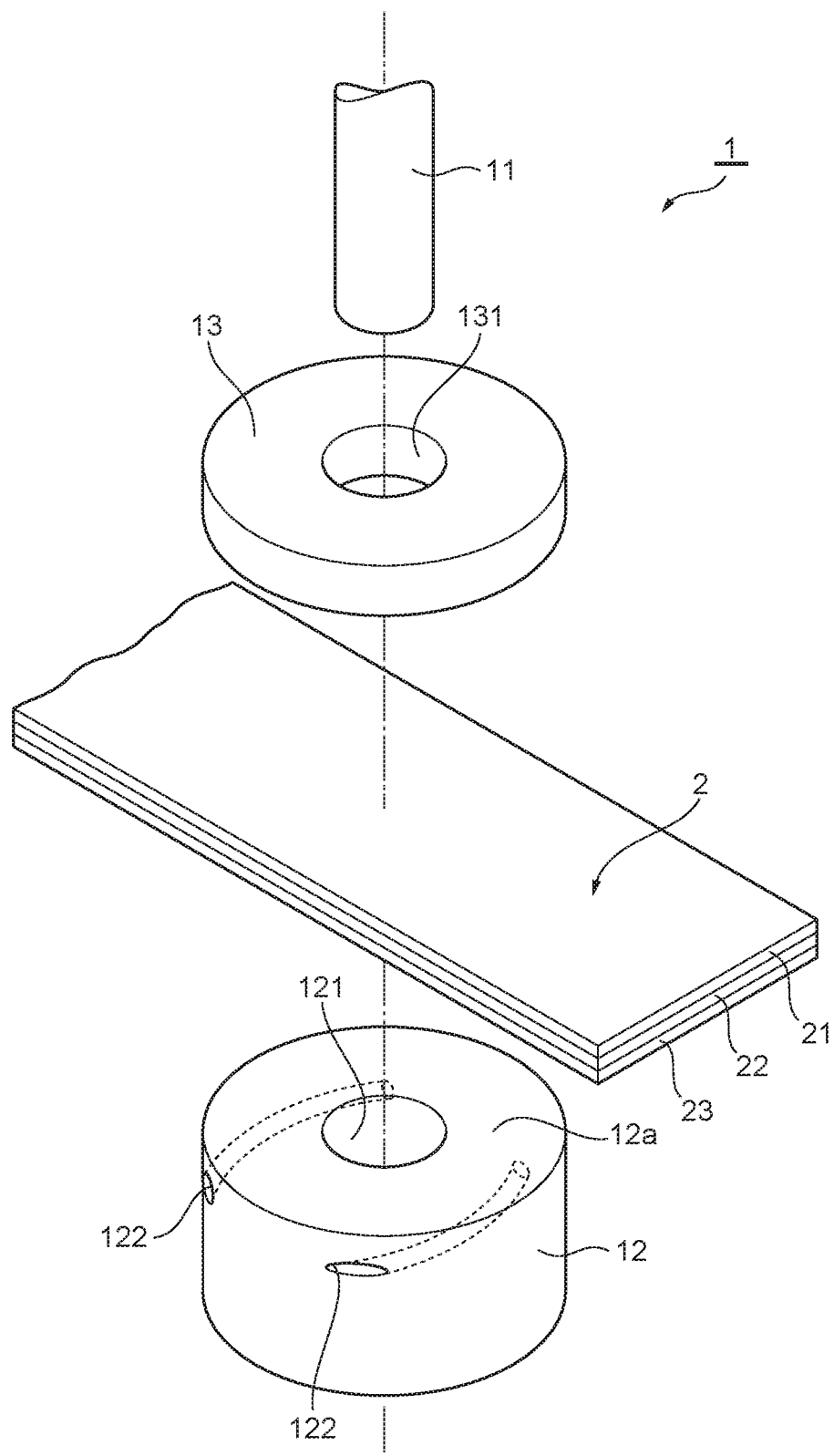
FIG. 1 is an exploded perspective view of a pressing machine to manufacture an iron core.

The following describes one embodiment of a method for manufacturing an iron core according to the present disclosure, with reference to the drawings. Like reference numerals designate like parts throughout the figures of the present specification to omit their duplicated descriptions. In the following descriptions, upper and lower directions and positions are based on the typical operating state of a pressing machine to manufacture an iron core, i.e., the punch is disposed above and the die is disposed below.

Figure 2:
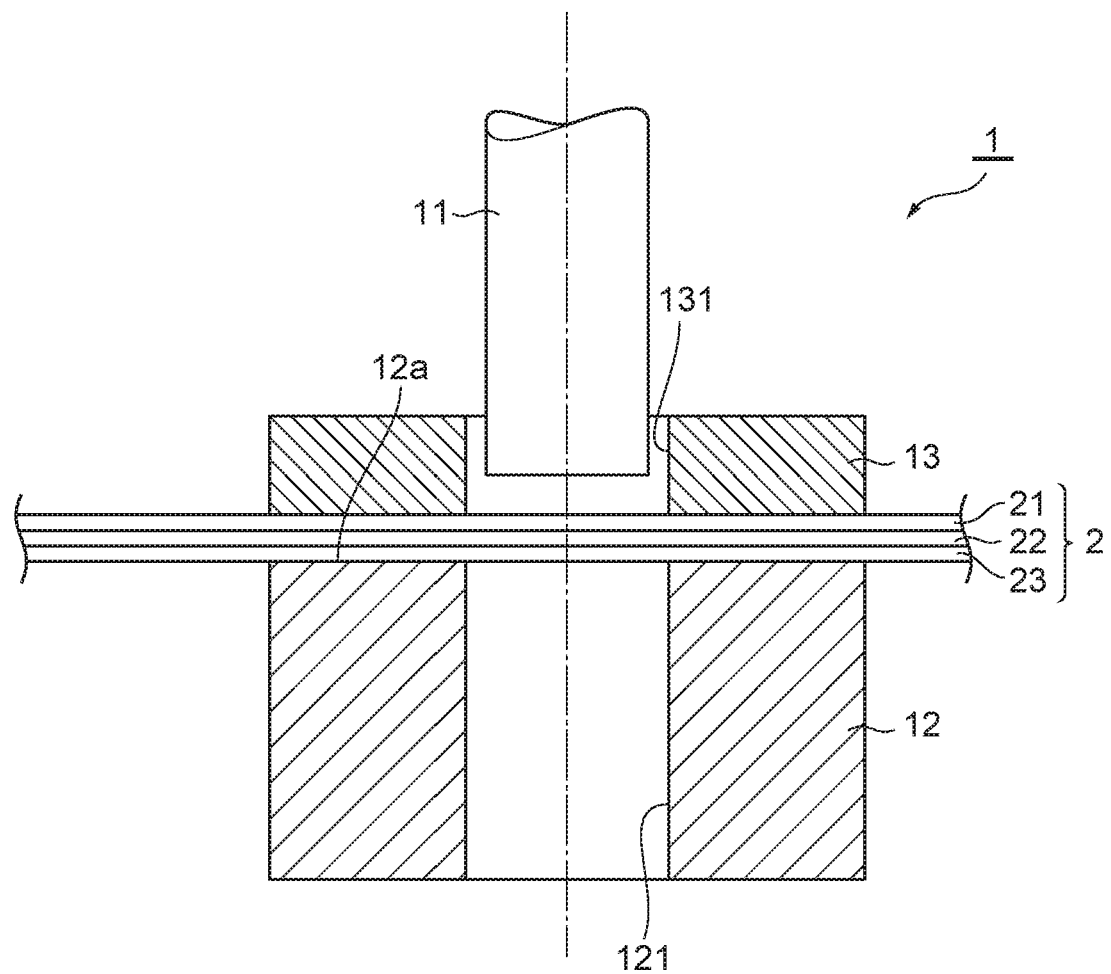
FIG. 2 is a schematic cross-sectional view of a pressing machine to manufacture an iron core.

Referring firstly to FIG. 1 and FIG. 2, the following describes the configuration of a pressing machine to manufacture an iron core. The pressing machine 1 includes: a punch 11 disposed above a laminate 2 as a target of the press working, a die 12 disposed below the laminate 2; and a holder 13 disposed above the laminate 2 to be opposed to the die 12.

The punch 11 has a cylindrical shape, for example, and is movable up and down by a lifting mechanism not illustrated. In other words, this punch 11 is movable close to or away from the die 12.

The die 12 has a shape to match with the shape of the punch 11 (a cylindrical shape in this example), and has a die-hole 121 at a center, into which the punch 11 is insertable. The die 12 internally includes a plurality of (two in FIG. 1) heater holes 122 to insert a cartridge heater (not illustrated). The cartridge heater heats the laminate 2 via an upper face 12a of the die 12 when the laminate 2 is placed on the upper face 12a. In order to improve the heating efficiency of the laminate 2, the heater holes 122 in some embodiments are disposed close to the upper face 12a of the die 12. Such a cartridge heater gives a temperature gradient to the laminate 2 quickly with a simple structure.

The holder 13 has a substantially disk shape, and has a through hole 131 at a center. The through hole 131 has the same dimension as the inner diameter of the die hole 121. This holder 13 cooperates with the die 12 to fix the laminate 2.

The laminate 2 is a laminate of a plurality of metal plates for iron core. The laminate 2 of the present embodiment includes three metal plates for iron core (i.e., an upper metal plate for iron core 21, an intermediate metal plate for iron core 22, and a lower metal plate for iron core 23) that are stacked in the up-down direction. These metal plates for iron core include a metal material, such as amorphous metal and magnetic steel sheets. In some embodiments, the metal plates for iron core include amorphous metal to reduce the iron loss.

Figure 3:
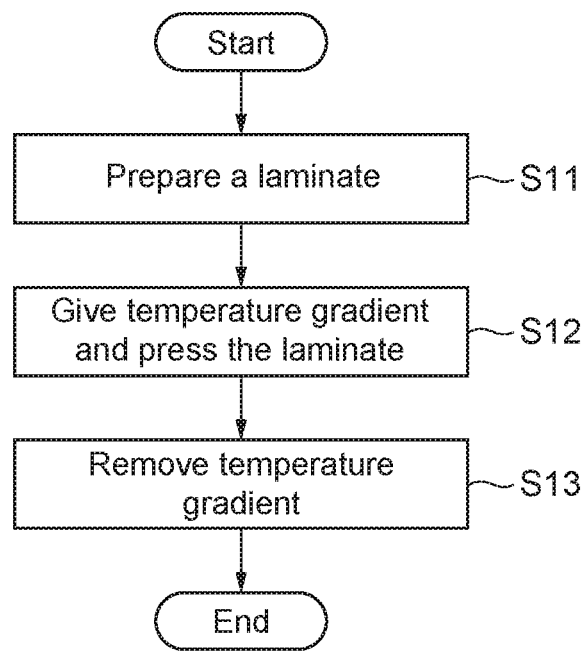
FIG. 3 is a flowchart of the method for manufacturing an iron core according to one embodiment.

Referring to FIG. 3, the following describes a method for manufacturing an iron core. The method for manufacturing an iron core of the present embodiment mainly includes: a laminate preparation step S11 of preparing a laminate 2; a pressing step S12 of giving a temperature gradient to the laminate 2 and pressing the laminate 2; and a temperature-gradient removal step S13 of removing the temperature gradient from the laminate 2.

The laminate preparation step S11 disposes the upper metal plate for iron core 21, the intermediate metal plate for iron core 22, and the lower metal plate for iron core 23 in this order, and bonds these metal plates for iron core with adhesive, for example, to prepare a belt-like laminate 2. Such a prepared laminate 2 is intermittently conveyed to the pressing machine 1 by a conveying roller, for example.

The pressing step S12 gives a temperature gradient to the laminate 2 prepared at the laminate preparation step S11 and presses the laminate 2 with the pressing machine 1 as stated above into a predetermined shape. Specifically as shown in FIG. 1 and FIG. 2, the laminate 2 is disposed between the punch 11 and the die 12, and a temperature gradient is given to the laminate 2 using a cartridge heater inserted into the heater holes 122 of the die 12. The temperature gradient in this example is given to the laminate 2 so that the temperature rises from the punch-side 11 to the die-side 12 in the stacking direction (i.e., up-down direction) of the laminate 2.

During the step, the lower metal plate for iron core 23 the closest to the die 12 is firstly heated among the upper metal plate for iron core 21, the intermediate metal plate for iron core 22, and the lower metal plate for iron core 23 of the laminate 2, and the intermediate metal plate for iron core 22 is heated next. The upper metal plate for iron core 21 located the furthest from the die 12 (i.e., the closest to the punch 11) is heated at the end. This causes a temperature difference among the upper metal plate for iron core 21, the intermediate metal plate for iron core 22, and the lower metal plate for iron core 23 in accordance with a difference in distance from the die 12. In other words, a temperature gradient occurs in the stacking direction of the laminate 2.

In some embodiments, the step particularly does not include the time to heat the laminate 2, and gives the temperature gradient during stationary time that is required for pressing. To this end, the method in one example changes the type of the cartridge heater and the number of the cartridge heaters disposed based on the linear expansion coefficient of a material for the metal plates for iron core and the contact area between the metal plate for iron core and the upper face 12a of the die 12, for example. In this way, the method gives a temperature gradient without changing the stationary time required for pressing. This reduces the influences from a time gradient given on the manufacturing time of an iron core.

The temperature-gradient removal step S13 leaves the pressed laminate 2 in a room-temperature atmosphere, for example, to air-cool the laminate and so remove the temperature gradient given to the laminate 2. That is, the "temperature-gradient removal" in this example means bringing the temperature of the laminate 2 back to room temperatures. This does not require any device to remove the temperature gradient, and so saves the manufacturing cost.

The following describes the advantageous effect of the method for manufacturing an iron core according to the present embodiment, with reference to FIGS. 4A to 4D. At the laminate preparation step S11, the upper metal plate for iron core 21, the intermediate metal plate for iron core 22, and the lower metal plate for iron core 23 are stacked, and these metal plates do not differ in dimension mutually (see FIG. 4A).

At the pressing step S12, a temperature gradient is given to the laminate 2 so that the temperature rises from the punch-side 11 to the die-side 12 in the stacking direction of the laminate 2. Each of the metal plates for iron core stacked from the punch 11 to the die 12 thermal-expands, and the amount of the thermal expansion differs with the temperature of the metal plate. As stated above, among the upper metal plate for iron core 21, the intermediate metal plate for iron core 22, and the lower metal plate for iron core 23 of the laminate 2, the lower metal plate for iron core 23 is the closest to the die 12, and so has the highest temperature and has the largest amount of thermal expansion. The temperature of the metal plates gradually decreases with increase in distance from the die 12, and so the amount of thermal expansion decreases in the order of the intermediate metal plate for iron core 22 and the upper metal plate for iron core 21 (see FIG. 4B).

Figure 4A:
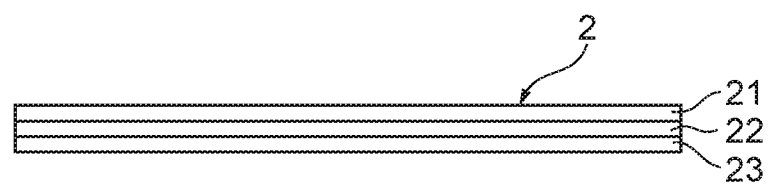
FIGS. 4A to 4D describes the advantageous effects of the method for manufacturing an iron core.
Figure 4B:
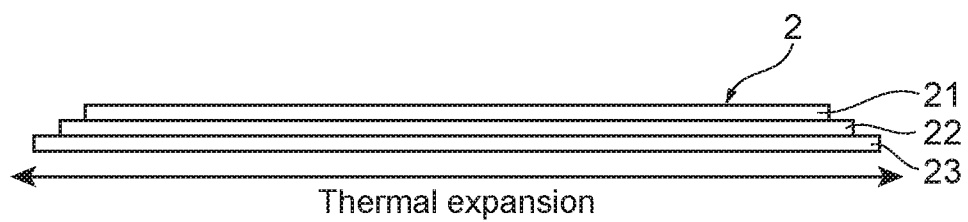
Figure 4C:
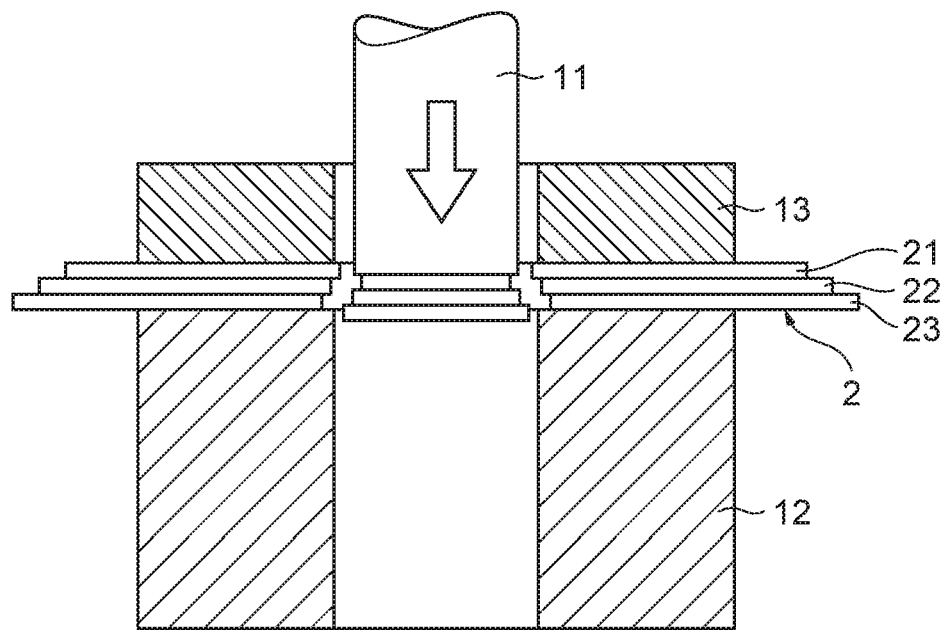
Figure 4D:
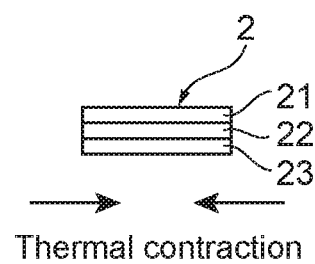

Then the laminate 2 including these thermally-expanded metal plates for iron core is pressed, whereby variation occurs in the dimension after the processing among the upper metal plate for iron core 21, the intermediate metal plate for iron core 22, and the lower metal plate for iron core 23 (see FIG. 4C).

The temperature-gradient removal step S13 removes the temperature gradient from the laminate 2, so that the expanded metal plates for iron core thermally contract. At this step, the amount of thermal contraction increases in the order of the upper metal plate for iron core 21, the intermediate metal plate for iron core 22, and the lower metal plate for iron core 23. This reduces or removes the variation in dimension after the processing among the upper metal plate for iron core 21, the intermediate metal plate for iron core 22, and the lower metal plate for iron core 23 (see FIG. 4D). As a result, the method for manufacturing iron core of the present embodiment reduces variation in dimensions of the metal plates for iron core that occurs during the pressing of the laminate of these metal plates.

The present inventors prepared laminates 2 each including the upper metal plate for iron core 21, the intermediate metal plate for iron core 22, and the lower metal plate for iron core 23, which were made of amorphous metal (thickness 2.5 µm, linear expansion coefficient $4.3 \times 10^{-6}/°$ C.), and conducted thermal analysis of these laminates 2 under the condition of punching to form a round hole of φ170 mm with the pressing machine 1 for both of the cases of giving a temperature gradient and not giving a temperature gradient. The thermal analysis was conducted when 0.01 second passed after placing the laminate 2 on the upper face 12a of the die 12.

The result of the thermal analysis showed that the laminate without a temperature gradient given had a dimensional difference (i.e., variation in dimension) of 0.02 mm between the upper metal plate for iron core 21 and the lower metal plate for iron core 23. The present inventors found that in order to remove this dimensional difference (0.02 mm), a temperature gradient to be given to the laminate 2 is such that the temperature of the lower metal plate for iron core 23 is higher than that of the upper metal plate for iron core 21 by about 30° C. As a result of the thermal analysis in this case, the die 12 was at 70° C., the holder 13 was at 20° C. (room temperature), the upper metal plate for iron core 21 was at 20.2° C., the intermediate metal plate for iron core 22 was 25.0° C., and the lower metal plate for iron core 23 was at 50.8° C.

The present embodiment describes the example of giving a temperature gradient to the laminate 2 with a cartridge heater inserted into the die 12. In another embodiment, a temperature controller may be used instead of the cartridge heater. In yet another embodiment, the method shown in FIG. 5 and FIG. 6 may be used.

Figure 5:
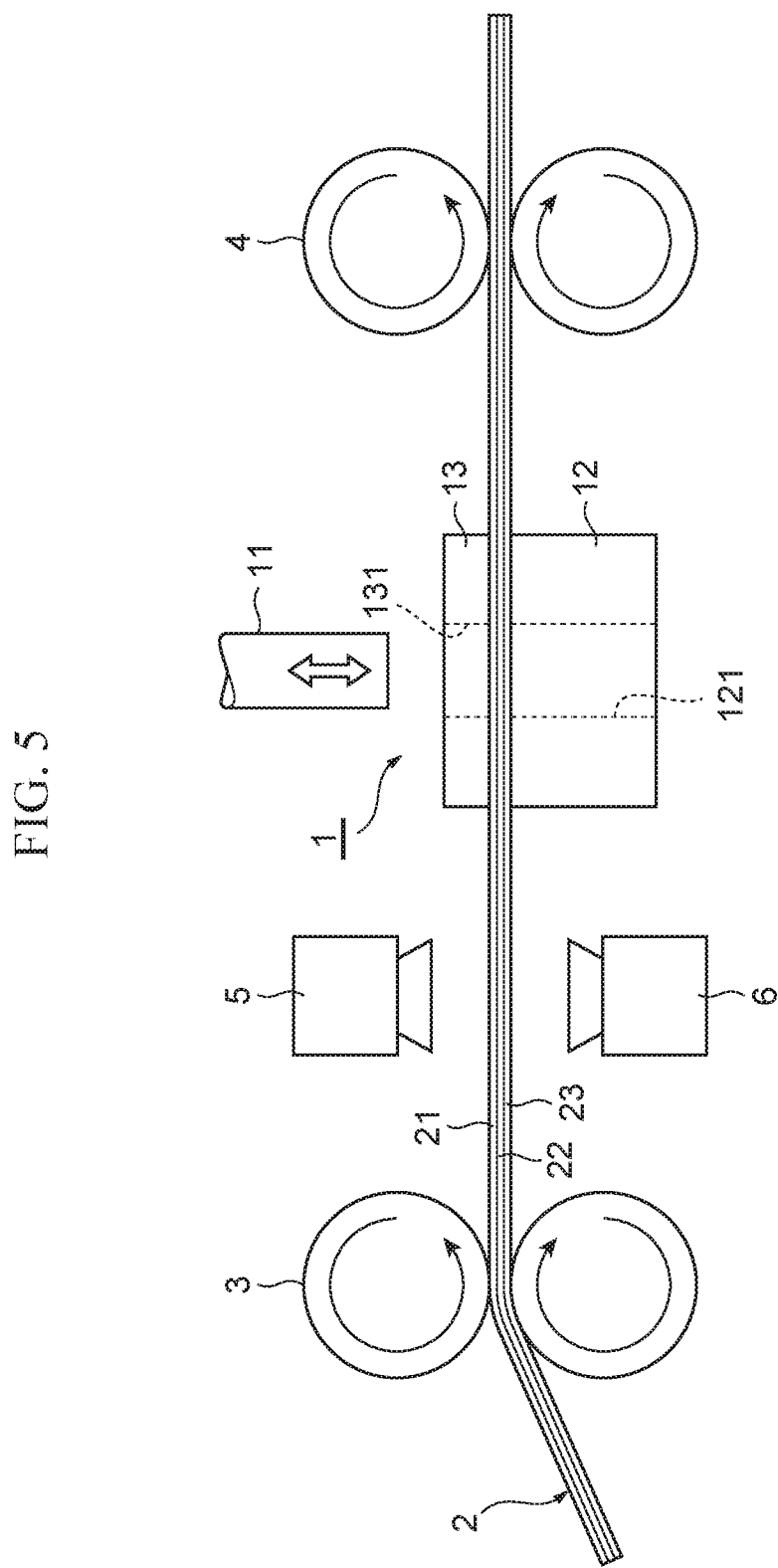
FIG. 5 is a schematic view to explain the method of giving a temperature gradient.

The method shown in FIG. 5 gives a temperature gradient to the laminate 2 during the conveyance of the laminate 2. Specifically this method includes a pair of upper and lower upstream conveying rollers 3 disposed upstream of the pressing machine 1 and a pair of upper and lower downstream conveying rollers 4 disposed downstream of the pressing machine 1. The pressing machine 1 in this method does not include a cartridge heater.

The upstream conveying rollers 3 rotate in the directions indicated by arrows in the drawing and sandwich the belt-like laminate 2 between the rollers to convey the laminate 2 toward the pressing machine 1. The downstream conveying rollers 4 rotate in the directions indicated by arrows in the drawing and sandwich the pressed laminate 2 between the rollers to convey the laminate 2 to the next step. These conveying rollers are made of metal, such as stainless steel.

The method further includes a cold-air blower 5 to blow cold air to the upper metal plate for iron core 21 and a hot-air blower 6 to blow hot air to the lower metal plate for iron core 23. These air blowers are disposed between the upstream conveying rollers 3 and the pressing machine 1. In this way, this method blows cold air from the cold-air blower 5 to the upper metal plate for iron core 21 located close to the punch 11 and blows hot air from the hot-air blower 6 to the lower metal plate for iron core 23 located close to the die 12 while conveying the laminate 2. This gives a temperature gradient to the laminate 2 so that the temperature rises from the punch-side 11 to the die-side 12. In some embodiments, the temperature is higher at the lower metal plate for iron core 23 than at the upper metal plate for iron core 21 by about 30° C.

Figure 6:
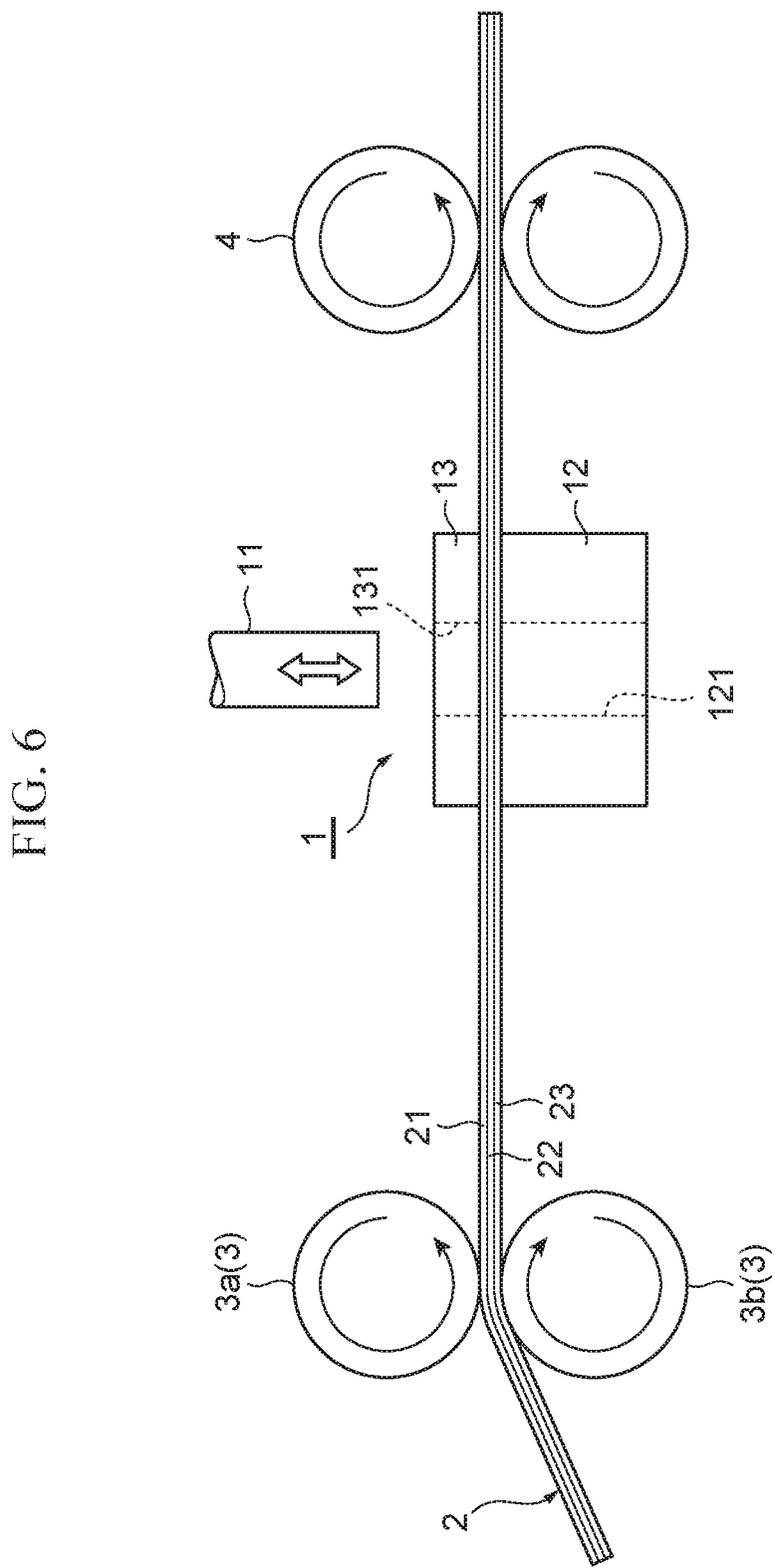
FIG. 6 is a schematic view to explain the method of giving a temperature gradient.

FIG. 6 shows another method of giving a temperature gradient to the laminate 2 during the conveyance of the laminate 2. Specifically this method includes a pair of upper and lower upstream conveying rollers 3, and the upper roller 3a disposed above internally includes a cooling device (not illustrated), and the lower roller 3b disposed below internally includes a heating device (not illustrated). That is, this method gives a low temperature to the upper metal plate for iron core 21 via the upper roller 3a and gives a high temperature to the lower metal plate for iron core 23 via the lower roller 3b while conveying the laminate 2. This gives a temperature gradient to the laminate 2 so that the temperature rises from the punch-side 11 to the die-side 12. In some embodiments, the temperature is higher at the lower metal plate for iron core 23 than at the upper metal plate for iron core 21 by about 30° C.

That is a detailed description of the embodiments of the present disclosure. The present disclosure is not limited to the above-stated embodiment, and the design may be modified variously without departing from the spirits of the present disclosure.

The above embodiment describes the example of stacking three metal plates for iron core as the laminate. The number of metal plates is not limited to three, and may increase or decrease as needed. The above embodiment describes the example of including the pressing machine 1 having the punch 11, the die 12 and the holder 13. Another embodiment may include a die having a punch and a die. The above embodiment describes the example of cylindrical punch and die. The shape of the punch and the die is not limited to a cylindrical shape, which may have a shape to match with an iron core.

DESCRIPTION OF SYMBOLS

1 Pressing machine
2 Laminate
3 Upstream conveying roller
3a Upper roller
3b Lower roller
4 Downstream conveying roller
5 Cold air blower
6 Hot air blower
11 Punch
12 Die
13 Holder
21 Upper metal plate for iron core
22 Intermediate metal plate for iron core
23 Lower metal plate for iron core
121 Die hole
122 Heater hole
131 Through hole

What is claimed is:
1. A method for manufacturing an iron core operatively associated with a press device comprising a punch and a die, comprising steps of:
   a laminate preparation step of stacking a plurality of metal plates for iron core to prepare a laminate;
   a pressing step of giving a temperature gradient to the laminate and pressing the laminate with the punch device; and
   a temperature-gradient removal step of removing the temperature gradient from the laminate, wherein
the pressing step gives the temperature gradient to the laminate so that a temperature rises from a part close to the punch to a part close to the die in a stacking direction of the laminate.

2. The method for manufacturing the iron core according to claim 1, wherein the metal plates for iron core include amorphous metal.

3. The method for manufacturing the iron core according to claim 1, wherein the die includes a heater, and
the pressing step gives the temperature gradient to the laminate with the heater.

4. The method for manufacturing the iron core according to claim 1, wherein the temperature gradient is controlled based on a linear expansion coefficient of the metal plates for iron core and a contact area between the metal plate for iron core and an upper face of the die.

5. The method for manufacturing the iron core according to claim 1, wherein the temperature-gradient removal step returns a temperature of the laminate to a room temperature.

* * * * *